(12) United States Patent
Burcham et al.

(10) Patent No.: US 10,891,017 B1
(45) Date of Patent: Jan. 12, 2021

(54) ROTATING ICON SELECTION AND INTERACTION SOFTWARE DEVELOPMENT KIT (SDK)

(71) Applicant: Sprint Communications Company L.P., Overland Park, KS (US)

(72) Inventors: Robert H. Burcham, Overland Park, KS (US); M. Jeffrey Stone, Boynton, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 189 days.

(21) Appl. No.: 16/112,642

(22) Filed: Aug. 25, 2018

(51) Int. Cl.
| | |
|---|---|
| *G06F 3/0481* | (2013.01) |
| *H04M 1/725* | (2006.01) |
| *G06F 9/451* | (2018.01) |
| *G06F 3/0482* | (2013.01) |
| *G06F 3/0488* | (2013.01) |

(52) U.S. Cl.
CPC ........ *G06F 3/04817* (2013.01); *G06F 3/0482* (2013.01); *G06F 9/451* (2018.02); *H04M 1/72583* (2013.01); *G06F 3/0488* (2013.01)

(58) Field of Classification Search
CPC .... G06F 3/04817; G06F 9/451; G06F 3/0482; G06F 3/0488; H04M 1/72583
See application file for complete search history.

(56) References Cited

U.S. PATENT DOCUMENTS

| | | |
|---|---|---|
| 5,600,776 A | 2/1997 | Johnson et al. |
| 5,806,071 A | 9/1998 | Balderrama et al. |
| 6,441,831 B1 | 8/2002 | Abramowitz et al. |
| 6,882,290 B2 | 4/2005 | French et al. |
| 7,409,208 B1 | 8/2008 | Clare et al. |
| 7,530,079 B2 | 5/2009 | Stubbs et al. |
| 7,552,432 B2 | 6/2009 | Aiba |
| 7,681,134 B1 | 3/2010 | Grechishkin et al. |
| 7,788,593 B1 | 8/2010 | Grechishkin et al. |
| 7,895,579 B2 | 2/2011 | Guerrera et al. |
| 8,136,100 B1 | 3/2012 | Goldman |

(Continued)

OTHER PUBLICATIONS

FAIPP Pre-Interview Communication dated Aug. 25, 2014, U.S. Appl. No. 13/940,251, filed Jul. 11, 2013.

(Continued)

*Primary Examiner* — Angie Badawi

(57) ABSTRACT

A mobile communication device. The mobile communication device comprises a display, a processor, a non-transitory memory, an application launcher stored in the non-transitory, and a first mobile application comprising a rotating icon software development kit (SDK) stored in the non-transitory memory. When the first mobile application is executed by the processor, the SDK requests the application launcher to present application icons in a rotation sequence in a same position on the display, where the application icons comprises a first icon and a second icon, when the first icon is selected, the application launcher launches the first mobile application, and when the second icon is selected, the application launcher launches the first mobile application, an alternative activity of the first mobile application is performed, and the first mobile application accesses a link to a second mobile application associated with the second icon, where the link references an application data store.

20 Claims, 8 Drawing Sheets

(56) References Cited

U.S. PATENT DOCUMENTS

| | | |
|---|---|---|
| 8,185,097 B2 | 5/2012 | Vanderlinden et al. |
| 8,468,164 B1 | 6/2013 | Paleja et al. |
| 8,522,343 B2 | 8/2013 | Hernacki |
| 8,577,737 B1 | 11/2013 | Anacker et al. |
| 8,650,096 B2 | 2/2014 | Van Buskirk et al. |
| 8,855,012 B1 | 10/2014 | Suri |
| 8,930,940 B2 | 1/2015 | Xu et al. |
| 9,092,291 B1 | 7/2015 | Adib et al. |
| 9,098,366 B1 | 8/2015 | Adib et al. |
| 9,124,719 B2 | 9/2015 | Inlow et al. |
| 9,304,668 B2 | 4/2016 | Rezende et al. |
| 9,319,270 B2 | 4/2016 | Bestmann et al. |
| 9,338,158 B2 | 5/2016 | Storm |
| 9,357,378 B1 | 5/2016 | Delker et al. |
| 9,398,462 B1 | 7/2016 | Delker et al. |
| 9,483,253 B1 * | 11/2016 | Schwermann .......... H04L 67/34 |
| 9,513,888 B1 | 12/2016 | Fultz et al. |
| 9,594,471 B1 | 3/2017 | Callan et al. |
| 9,794,727 B1 | 10/2017 | Delker et al. |
| 9,871,905 B1 | 1/2018 | Habiger et al. |
| 2004/0148598 A1 | 7/2004 | Kita et al. |
| 2004/0237082 A1 | 11/2004 | Alcazar et al. |
| 2004/0254975 A1 | 12/2004 | Teh et al. |
| 2005/0060665 A1 | 3/2005 | Rekimoto |
| 2006/0168340 A1 | 7/2006 | Heller et al. |
| 2006/0235760 A1 | 10/2006 | Sanjan et al. |
| 2006/0235944 A1 | 10/2006 | Haslam |
| 2007/0015538 A1 | 1/2007 | Wang |
| 2007/0130156 A1 | 6/2007 | Tenhunen et al. |
| 2007/0143740 A1 | 6/2007 | Hoerentrup et al. |
| 2008/0046583 A1 | 2/2008 | Rao |
| 2008/0051076 A1 | 2/2008 | O'Shaughnessy et al. |
| 2008/0155275 A1 | 6/2008 | Natarajan et al. |
| 2008/0160970 A1 | 7/2008 | Srinivas Reddy et al. |
| 2008/0276182 A1 | 11/2008 | Leow |
| 2009/0064055 A1 | 3/2009 | Chaudhri et al. |
| 2009/0158407 A1 | 6/2009 | Nicodemus et al. |
| 2009/0199176 A1 | 8/2009 | Nath et al. |
| 2009/0259974 A1 | 10/2009 | Lin |
| 2009/0288079 A1 | 11/2009 | Zuber et al. |
| 2010/0250368 A1 | 9/2010 | Porco |
| 2010/0269107 A1 | 10/2010 | Jung et al. |
| 2010/0306702 A1 | 12/2010 | Warner |
| 2010/0311391 A1 | 12/2010 | Siu et al. |
| 2010/0311468 A1 | 12/2010 | Shi et al. |
| 2010/0321323 A1 | 12/2010 | Kim |
| 2011/0034160 A1 | 2/2011 | Corda et al. |
| 2011/0086611 A1 | 4/2011 | Klein et al. |
| 2011/0208865 A1 | 8/2011 | Knowles et al. |
| 2012/0015624 A1 | 1/2012 | Scott et al. |
| 2012/0030512 A1 | 2/2012 | Wadhwa et al. |
| 2012/0054022 A1 | 3/2012 | Kosashvili |
| 2012/0072311 A1 | 3/2012 | Khan |
| 2012/0272178 A1 | 10/2012 | Oygard et al. |
| 2013/0013671 A1 | 1/2013 | Relan et al. |
| 2013/0031541 A1 | 1/2013 | Wilks et al. |
| 2013/0080911 A1 | 3/2013 | Klemm |
| 2013/0275560 A1 | 10/2013 | Bestmann et al. |
| 2013/0326359 A1 | 12/2013 | Beckert et al. |
| 2013/0339833 A1 | 12/2013 | Chen et al. |
| 2014/0068779 A1 | 3/2014 | Tan et al. |
| 2014/0122563 A1 | 5/2014 | Singh et al. |
| 2014/0298320 A1 | 10/2014 | Xu et al. |
| 2015/0011311 A1 | 1/2015 | Relan et al. |
| 2015/0040246 A1 | 2/2015 | Yuen et al. |
| 2015/0220245 A1 | 8/2015 | Wojcik et al. |
| 2015/0304506 A1 | 10/2015 | Zhe et al. |
| 2015/0319178 A1 | 11/2015 | Desai et al. |
| 2015/0331590 A1 | 11/2015 | Yasu |
| 2015/0363958 A1 | 12/2015 | Zhu et al. |
| 2015/0370428 A1 | 12/2015 | Chan et al. |
| 2016/0044091 A1 | 2/2016 | Doumet |
| 2016/0119483 A1 * | 4/2016 | Chisty .................. H04W 4/16 370/259 |
| 2016/0239317 A1 | 8/2016 | Cuddihy et al. |
| 2017/0083711 A1 * | 3/2017 | Hemaraj ................ G06F 3/167 |
| 2019/0104216 A1 * | 4/2019 | Van Hecke .......... G06F 3/0482 |

OTHER PUBLICATIONS

First Action Interview Office Action dated Oct. 17, 2014, U.S. Appl. No. 13/940,251, filed Jul. 11, 2013.

Notice of Allowance dated Mar. 9, 2015, U.S. Appl. No. 13/940,251, filed Jul. 11, 2013.

FAIPP Pre-Interview Communication dated Aug. 25, 2014, U.S. Appl. No. 13/940,253, filed Jul. 11, 2013.

First Action Interview Office Action dated Oct. 17, 2014, U.S. Appl. No. 13/940,253, filed Jul. 11, 2013.

Notice of Allowance dated Mar. 6, 2015, U.S. Appl. No. 13/940,253, filed Jul. 11, 2013.

FAIPP Pre-Interview Communication dated Jul. 24, 2015, U.S. Appl. No. 14/168,007, filed Jan. 30, 2014.

Final Office Action dated Jan. 28, 2016, U.S. Appl. No. 14/168,007, filed Jan. 30, 2014.

Advisory Action dated Mar. 29, 2016, U.S. Appl. No. 14/168,007, filed Jan. 30, 2014.

Office Action dated Apr. 14, 2016, U.S. Appl. No. 14/168,007, filed Jan. 30, 2014.

Notice of Allowance dated Aug. 3, 2016, U.S. Appl. No. 14/168,007, filed Jan. 30, 2014.

FAIPP Pre-Interview Communication dated Aug. 12, 2016, U.S. Appl. No. 14/169,544, filed Jan. 31, 2014.

Notice of Allowance dated Nov. 4, 2016, U.S. Appl. No. 14/169,544, filed Jan. 31, 2014.

Office Action dated Oct. 1, 2015, U.S. Appl. No. 14/701,156, filed Apr. 30, 2015.

Final Office Action dated Feb. 8, 2016, U.S. Appl. No. 14/701,156, filed Apr. 30, 2015.

Advisory Action dated Apr. 15, 2016, U.S. Appl. No. 14/701,156, filed Apr. 30, 2015.

Notice of Allowance dated Jun. 20, 2016, U.S. Appl. No. 14/701,156, filed Apr. 30, 2015.

Notice of Allowance dated Feb. 3, 2016, U.S. Appl. No. 14/639,056, filed Mar. 4, 2015.

Notice of Allowance dated Mar. 11, 2016, U.S. Appl. No. 14/639,060, filed Mar. 4, 2015.

FAIPP Pre-Interview Communication dated Apr. 10, 2017, U.S. Appl. No. 15/164,530, filed May 25, 2016.

Notice of Allowance dated Jun. 14, 2017, U.S. Appl. No. 15/164,530, filed May 25, 2016.

Notice of Allowance dated Aug. 31, 2017, U.S. Appl. No. 15/232,569, filed Aug. 9, 2016.

Mehrotra, et al., "SenSocial: a Middleware for Integrating Online Social Networks and Mobile Sensing Data Streams," ACM, Middleware '14, Dec. 8-12, 2014, Bordeaux, France.

Bianchini, Devis, et al., "Semantics Enabled Web APIs Selection Patterns," Dept. of Information Engineering, Università degli Studia di Brescia, Brescia, Italy, Sep. 2011, 5 pages.

Ki, Taeyeon, et al., "API Virtualization for Platform Openness in Android," Department of Computer Science and Engineering, University at Buffalo, the State University of New York, Jun. 2016, 2 pages.

* cited by examiner

ROTATING ICON SELECTION AND INTERACTION SOFTWARE DEVELOPMENT KIT (SDK)

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many mobile communication devices not only provide wireless communication services but serve as an execution platform for applications. Some of the applications may be installed during manufacturing of the mobile communication device and may be installed as system applications. Some applications may be downloaded and installed by users and are typically referred to as mobile applications or user apps. Examples of mobile applications are game applications, streaming music applications, navigation applications, restaurant selection applications. Icons associated with system applications and mobile applications may be presented by an application launcher on a screen of the mobile communication device. When a user touches an icon, the application launcher receives this input and typically launches execution of the application associated with the icon in response to the input.

SUMMARY

In an embodiment, a mobile communication device is disclosed. The mobile communication device comprises a display, a processor, a non-transitory memory, an application launcher stored in the non-transitory memory that, when executed by the processor, presents a plurality of icons defined by mobile applications and launches execution of a mobile application, and a first mobile application stored in the non-transitory memory. When executed by the processor, the first mobile application requests the application launcher to present a first icon associated with the first mobile application at a first time, requests the application launcher to present a second icon associated with a second mobile application available in an application data store at a second time, where the second time is after the first time, requests the application launcher to present a third icon associated with a third mobile application available in the application data store at a third time, where the third time is after the second time, and requests the application launcher to present the first icon at a fourth time, where the fourth time is after the third time. The first mobile application thereby provides a rotating icon interface where when the first icon is selected, the application launcher launches the first mobile application and a primary activity of the first mobile application is performed, when the second icon is selected, the application launcher launches the first mobile application, an alternative activity of the first mobile application is performed, and the first mobile application accesses a link to the second mobile application that references the application data store, and when the third icon is selected, the application launcher launches the first mobile application, the alternative activity of the first mobile application is performed, and the first mobile application accesses a link to the third mobile application that references the application data store.

In another embodiment, a method of providing a rotating icon interface on a mobile communication device is disclosed. The method comprises presenting an icon associated with a mobile application on a display of the mobile communication device by an application launcher executing on the mobile communication device, requesting the application launcher to present a second icon adjacent to the icon on the display, where the request is made by a rotating icon software development kit (SDK) of the mobile application, receiving by the application launcher an input corresponding to a touch on the icon, and launching execution of the mobile application by the application launcher in response to the touch on the presented icon. The method further comprises receiving by the application launcher an input corresponding to a touch on the second icon, launching execution of an alternative activity of the mobile application by the application launcher in response to the touch on the second icon, and completing a communication link to an application store to information regarding an application associated with the second icon by the rotating icon SDK as the alternative activity.

In yet another embodiment, a mobile communication device is disclosed. The mobile communication device comprises a display, a processor, a non-transitory memory, an application launcher stored in the non-transitory memory that, when executed by the processor, presents a plurality of icons defined by mobile applications and launches execution of a selected mobile application, and a first mobile application comprising a rotating icon software development kit (SDK) stored in the non-transitory memory. When the first mobile application is executed by the processor, the SDK requests the application launcher to present a plurality of application icons in a rotation sequence in a same position on the display, where the plurality of application icons comprises a first icon and a second icon, and when the first icon is selected, the application launcher launches the first mobile application. When the second icon is selected, the application launcher launches the first mobile application, and an alternative activity of the first mobile application is performed, wherein the alternative activity comprises sending a first message comprising an identity of the second icon and requesting a uniform resource identifier (URI) or a uniform resource locator (URL) to a server computer, receiving a response message from the server computer comprising a link to an application store, downloading a second mobile application from the application store based on the link, and installing the second mobile application on the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
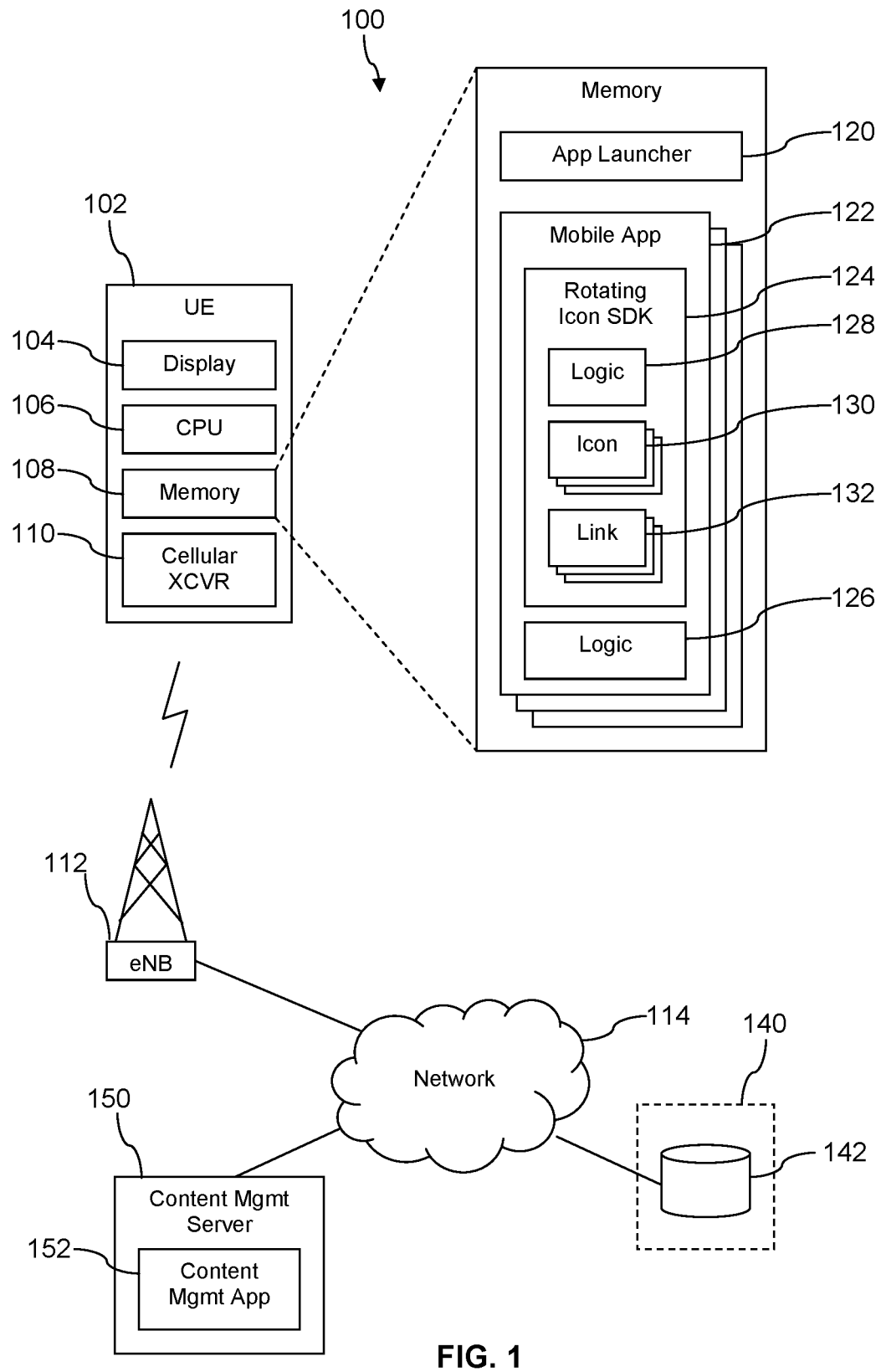
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a rotating icon selection and interaction software development kit (SDK) embedded in a user installed mobile application. Users often download applications from an application store or other mobile application distribution facility for installation on their mobile communication devices. Users can be delighted with the mobile applications they install, but sometimes it may be difficult to learn of other mobile applications that the user would want to install on his or her device. The rotating icon SDK disclosed herein provides a framework for informing users of mobile applications that they may wish to download and install, and also provides them with a deep link for reaching out to the application store to initiate installation of the mobile application with ease and convenience.

In an embodiment, the rotating icon SDK embedded in a mobile application previously installed on a mobile communication device causes an application launcher of the mobile communication device to present different application icons in the display space associated with the mobile application. For example, at a first time, the SDK requests the application launcher to present a first icon associated with the mobile application itself in the display. At a second time, the SDK requests the application launcher to present a second icon associated with a second mobile application available for download and installation from an application store in the same display position where the first icon was previously presented. At a third time, the SDK requests the application launcher to present a third icon associated with a third mobile application available for download and installation from the application store in the same display position where the first icon and the second icon were previously presented. At a fourth time, the SDK requests the application launcher to again present the first icon in the same display position. In this way, the first icon, the second icon, and the third icon may be said to be rotated by the SDK on the display.

In effect, the rotating icons functionality taught by the present disclosure resolves or at least ameliorates a technical problem of mobile communication devices: limited display space. By rotating icons for display in the same location of the display, the available display space of this location is effectively multiplied. In the example here, where three different icons are rotated to share, at different times, the same portion of the display, the area of this portion of the display is effectively multiplied by three. When the icons are changed, the previously presented icon may first fade out, and the next presented icon may fade in. Alternatively, the previously presented icon may first wipe away, and the next presented icon may wipe in. This method of handling the change of presented icons can help to cue the user to the change and reduce surprise or confusion when the user does not find the icon of the installed application presented. Said in other words, the user is less likely to overlook the change and hence will be advised of what is happening.

When a user selects any of the first icon, the second icon, or the third icon, the mobile application associated with the first icon is launched by the application launcher. What the mobile application does when it is launched depends on which of the first icon, the second icon, and the third icon was displayed at the time the user selection occurred. The SDK may store the identity of the icon that it has last requested the application launcher to present, and when the mobile application is launched, what instructions the mobile application executes depends on that saved identity.

If the first icon was presented at the time the user selection occurs (e.g., the identity of the first icon was stored by the SDK as the icon the SDK last requested the application launcher to present), the mobile application executes its customary or primary activity. For example, if the mobile application is a game, the game begins execution. If the mobile application is a restaurant reservation tool, the restaurant reservation tool interface is presented. If, however, the second icon was presented at the time the user selection occurs (e.g., the identity of the second icon was stored by the SDK as the icon the SDK last requested the application launcher to present), the primary activity (customary mobile application functionality) does not execute and instead the SDK executes an alternative activity which comprises a deep link to an address or reference associated in the SDK with the second icon. This deep link may be a link that establishes an Internet connection to an application store and accesses information content about a mobile application associated with the second icon or initiates a download and installation of the mobile application associated with the second icon. If the third icon was presented at the time the user selection occurs, the primary activity (customary mobile application functionality) does not execute and instead the SDK executes an alternative activity that involves following a deep link to the application store to a mobile application associated with the third icon.

In an embodiment, when the SDK follows a deep link associated with a mobile application, a two-step process of navigation is performed. First, the SDK reaches out to a content management server via a communication link to look-up a uniform resource identifier (URI) or a uniform resource locator (URL) associated with the displayed icon. Second, the SDK uses the URI/URL obtained in the first step to reach out to an application store to obtain further information about the mobile application associated with the displayed icon by the content management server and possibly to download and install the mobile application. This two-step navigation process promotes ease of changing the specific mobile application associated to the displayed icon.

The content management server may change the associations of rotating icons to mobile applications for different mobile communication devices independently (e.g., the content management server may associate a rotational icon presented on a display of a first mobile communication device to a first mobile application and associate the same rotational icon presented on a display of a second mobile communication device to a different second mobile application). The content management server may change the associations so as to refresh alternative mobile applications available to a user, because the mobile application previously associated to the icon has been installed, or for another reason. In an embodiment, the functionality described above as being performed by a content management server may be provided by the application store.

If either the second icon or the third icon is selected with a long press (e.g., a selection input which continues for a duration of time deemed by the application launcher to constitute a long press), a user interface screen may be presented on a display of the mobile communication device that presents a menu of user actions such as execute the installed mobile application, uninstall the mobile application, or perform another action. Alternatively, other touch patterns, for example a double tap touch pattern, may be associated with presenting the menu of user actions. In an embodiment, the long press or double tap selection while the second icon or the third icon is presented may simply invoke execution of the installed mobile application.

In an embodiment, if a user hovers over the second icon or the third icon (e.g., the user holds his or her finger close to but not actually touching the screen), the first icon may be displayed so as to confirm the first icon and/or the installed mobile application. In an embodiment, if a user hovers over the second icon or the third icon, the first icon may be displayed briefly and then be replaced on the display by the other icon (either the second icon or the third icon, whichever icon had been displayed when the hover action was initiated) so as to confirm the first icon and/or the installed mobile application. In an embodiment, if a user hovers over the second icon or the third icon, the first icon may be displayed in a flashing mode so as to confirm the first icon and/or the installed mobile application. In an embodiment, if a user hovers over the second icon or the third icon, the first icon and the other icon (either the second icon or the third icon, whichever icon had been displayed when the hover action was initiated) may alternately be displayed in succession so as to confirm the first icon and/or the installed mobile application. This response to hovering may promote reducing user confusion when the first icon—the icon associated with the installed mobile application—is not presented on the display screen where the user expected to see it. This response to hovering can also act to teach or accustom the user to the rotating icon feature in an intuitive way.

It is understood that some of the icons may be associated not with a mobile application in an application store but instead with content. Thus, clicking on the second icon may cause curated content (e.g., content determined by a content management server to likely be of interest to the user based on an analysis of demographics of the user and/or based on analysis of behavior of the user), to be presented by the mobile communication device, for example in a browser that is launched on the mobile communication device. The curated content may be a recently released musical track by an artist the user is known to like, and the musical track is played on a player application that is launched in response to clicking the second icon. The SDK, when the second icon is clicked on, or selected, may execute a deep link to an on-device media player that is appropriate for the associated content (e.g., music player for musical content, video player for video content, game engine for game content, image viewer for image content, etc.), launch the media player, access the subject content, and feed the content to the media player.

While in the example discussed above three icons were rotated, in other cases two icons may be rotated—the first icon associated with the installed mobile application and the second icon associated with a second mobile application not currently installed on the mobile application but accessible via the application store. In other cases, more than three icons are rotated. The rotating icon SDK may determine the timing for rotating the icons based on monitoring the behavior of the user of the mobile communication device. If the user is not using the mobile communication device, for example during a time of day when the user is deemed to be sleeping or commuting to or from work, the rotating icon SDK may present the icon associated with the installed mobile application and not rotate other icons in the place of the first icon. If the user is using the mobile communication device intermittently, for example during a working period, the rotating icon SDK may rotate the icons at a relatively slow rate, for example rotating once per minute. If the user is using the mobile communication device nearly continuously, the rotating icon SDK may rotate the icons at a relatively fast rate, for example rotating every five seconds, every ten seconds, or every fifteen seconds.

The rotating icon SDK may rotate the icons at a particular rate in response to an event, for example a user input or a user launch of a function of the mobile communication device. For example, the user may have established a pattern identified by the rotating icon SDK where the user first checks email, then checks a social networking application, and then launches an introverted application or a meditative application such as a game or a music playing application.

In an alternative embodiment, at the second time, the SDK may request the application launcher to present the second icon in a display space adjacent to the first icon, and the first icon may continue to be presented while the second icon is presented. At the third time, the SDK may request the application launcher to present the third icon in the display space where the second icon was previously presented. This alternative rotation presentation may avoid user confusion if the first icon were to disappear temporarily. In an embodiment, the portion of the display in which the first icon is displayed may be split, and both the first icon and the second icon may be presented side-by-side or above and below each other. The SDK may inquire of the operating system or of the application launcher if there is adjacent display space available, and if display space is available cause the second icon to be presented in the adjacent display space and otherwise employ the split-screen technique described above.

The rotating icon selection and interaction described above may help a user learn of new mobile applications that he or she wishes to download and install. The rotating icon selection and interaction described above can help a user learn of new content that they would want to consume, for example a recently released musical track, a recently published book, or a recently launched Internet blog. The rotating icons can be refreshed with different rotating applications associated with different mobile applications or refreshed with different content. The refreshed or updated rotating icons that are sent to the mobile communication device can be chosen by the content management server so that they are associated with mobile applications that are produced by the same mobile application developer. The rotating icons can be chosen by the content management server so that they are associated with mobile applications from a same category of mobile applications as the installed mobile application. The rotating icons can be chosen by the content management server so that they are associated with mobile applications from a different but complimentary category of mobile applications. The selected rotating icons that are chosen or selected by the content management server can be referred to as curated applications or curated content. The content management server can push updated rotating icons to rotating icon SDKs. Alternatively, the rotating icon SDKs can pull updated rotating icons from the content management server.

Turning now to FIG. 1, a communication system 100 is described. In an embodiment, the communication system 100 comprises a mobile communication device (user equipment—UE) 102 that comprises a display 104, a processor 106, a memory 108, and a cellular radio transceiver 110. The mobile communication device 102 may establish a wireless communication link from the cellular radio transceiver 110 to a cell site (eNB) 112 and, via the cell site 112, establish a communication link to the network 114. The wireless communication link from the cellular radio transceiver 110 to the cell site 112 may be established according to a long term evolution (LTE), a code division multiple access (CDMA), a global system for mobile communications (GSM), or a worldwide interoperability for microwave access (WiMAX) wireless communication protocol. The network 114 may be one or more private networks, one or more public networks, or a combination thereof. The mobile communication device 102 may be a mobile phone, a smart phone, a personal digital assistant (PDA), a wearable computer, a headset computer, a laptop computer, a tablet computer, or a notebook computer.

The memory 108 may comprise a non-volatile memory portion that stores an application launcher 120 and one or more mobile applications 122. The application launcher 120 may be installed by a manufacturer of the mobile communication device 102 and may be considered to be a system application. The application launcher 120 may present icons on the display 104 as requested by installed applications. The application launcher 120 may be informed of user inputs selecting application icons and launches applications that are selected. The application launcher 120 may pass different parameters to an application as it launches it, for example an indication whether to execute a primary activity of the application or an alternate activity of the application.

The mobile application 122 comprises a rotating icon software development kit (SDK) 124 and logic 126 or instructions. The logic 126 provides customary processing associated with the functionality to be delivered by the mobile application 122. For example, the mobile application 122 may be a restaurant finder application, and the logic 126 may interact with an application server (not shown) via the network 114 to provide information about restaurants in the proximity of the mobile communication device 102 For example, the mobile application 122 may be a streaming music application, and the logic 126 may interact with a streaming music content server (not shown) via the network 114 to provide music to the mobile communication device 102. The rotating icon SDK 124 provides functionality that supports rotating icon functionality.

The rotating icon SDK 124 comprises rotating icon logic 128, a plurality of icons 130, and one or more deep links 132. In an embodiment, the deep links 132 support the two-step navigation process described above. The icons 130 comprise an icon associated with the customary functionality of the mobile application 122 as well as one or more additional icons associated with content and/or mobile applications that may be accessed at a mobile application store 140 for example from a data store 142 storing mobile applications.

Figure 2:
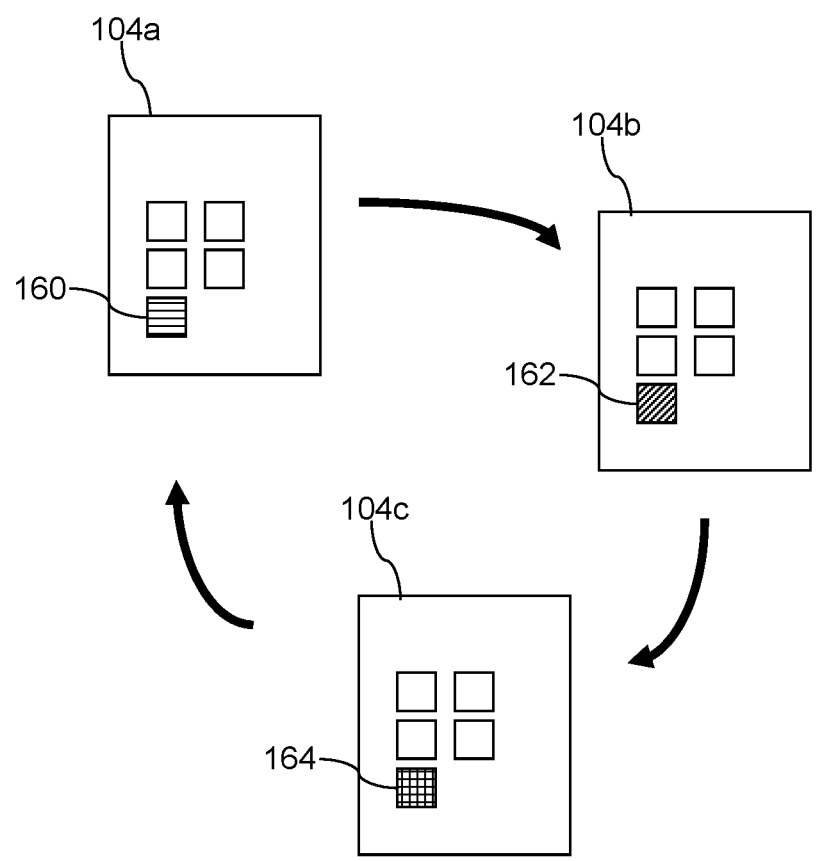
FIG. 2 is an illustration of a display screen of a mobile communication device according to an embodiment of the disclosure.

Turning now to FIG. 2, a sequence of states of the display 104 are described. At a first time the display 104a presents a plurality of application icons including a first icon 160 associated with the mobile application 122. At a second later time, the display 104b presents a plurality of application icons including a second icon 162 in the place formerly occupied by the first icon 160. At a third later time, the display 104c presents a plurality of application icons including a third icon 164 in the place formerly occupied by the second icon 162. At a fourth later time, the display 104a is again presented including the first icon 160 in the place formerly occupied by the third icon 164. In this example, the second time is after the first time, the third time is after the second time, and the fourth time is after the third time.

The change of icons placed in the same location at different times may be referred to as a rotation of icons and as rotating icons. The rotating icon SDK 124, for example the logic 128, causes the icons 160, 162, 164 to rotate by informing the application launcher 120 to display one of the icons 160, 162, 164 and then later informing the application launcher 120 to display a different one of the icons 160, 162, 164. By sequentially informing the application launcher 120 to display a different one of the icons 160, 162, 164, the rotating icon SDK 124 can cause the icons to be rotated in the display 104 as described above.

When the mobile application 122 is not executing, the rotating icon SDK 124 may use a service provided by an operating system (OS) of the mobile communication device 102 to invoke the mobile application 122 and/or the rotating icon SDK 124 briefly, for example long enough for the rotating icon SDK 124 to request the application launcher 120 to change the icon 160, 162, 164 presented in the display 104. For example, at the first time, the rotating icon SDK 124 may execute, request the application launcher 120 to present the first icon 160, request the OS to schedule the rotating icon SDK 124 to execute again in 10 seconds, and then go to sleep (e.g., terminate execution). When the OS calls the rotating icon SDK 124 to execute after 10 seconds (e.g., at the second time in the example above), the rotating icon SDK 124 executes, requests the application launcher 120 to present the second icon 162, requests the OS to schedule the rotating icon SDK 124 to execute again in 10 seconds, and then goes to sleep. When the OS calls the rotating icon SDK 124 to execute after 10 seconds (e.g., at the third time in the example above), the rotating icon SDK 124 executes, requests the application launcher 120 to present the third icon 164, requests the OS to schedule the rotating icon SDK 124 to execute again in 10 seconds, and then goes to sleep. When the OS calls the rotating icon SDK 124 to execute after 10 seconds (e.g., at the fourth time in the example above), the rotating icon SDK 124 executes, requests the application launcher 120 to present the first icon 160 again, requests the OS to schedule the rotating icon SDK 124 to execute again in 10 seconds, and then goes to sleep. The rotating icon SDK 124 may store the identity of the icon 160, 162, 164 that the application launcher 120 has been requested to present (e.g., the more recently requested icon).

The rotating icon SDK 124 can request the application launcher 120 to change the presented icon 160, 162, 164 at some other periodic interval than 10 seconds, for example every 5 seconds, every 15 seconds, every 30 seconds, or some other periodic interval. The rotating icon SDK 124 can request the application launcher 120 to present the icons 160, 162, 164 for different durations of time. For example, the rotating icon SDK 124 may request the application launcher 120 to present the first icon 160 for a longer time duration than the second icon 162 and the third icon 164 are presented. The rotating icon SDK 124 can request the application launcher 120 to change the presented icon 160, 162, 164 at different rotation rates based on time of day, based on analysis of a history of user interaction with the mobile communication device 102, or based on monitoring user interactions. The rotating icon SDK 124 can request the application launcher 120 to change the presented icon 160, 162, 164 at different rotation rates based on location of the mobile communication device and based on time of day. For example, the rotating icon SDK 124 may determine through analysis that the user interacts more frequently with the mobile communication device at home (e.g., a location that fits a dwell time pattern that correlates with a home location) at night after dinner time.

Figure 3:
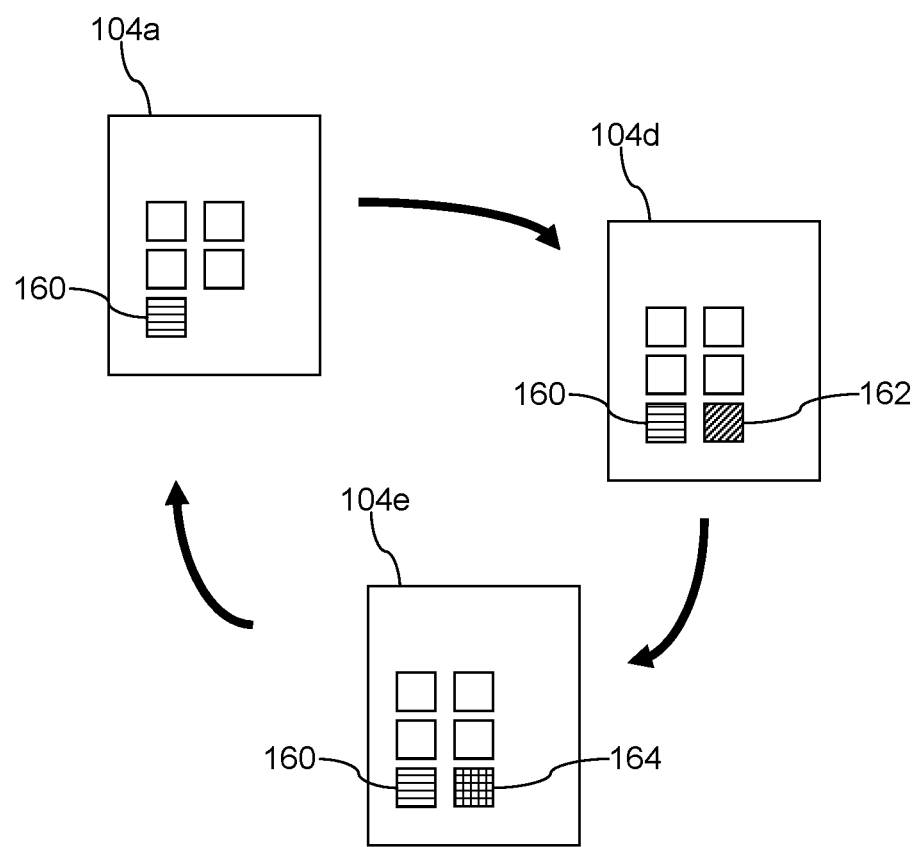
FIG. 3 is an illustration of another display screen of a mobile communication device according to an embodiment of the disclosure.

Turning now to FIG. 3, a sequence of states of the display 104 is described. At the first time, the display 104a presents a plurality of application icons including the first icon 160 associated with the mobile application 122. At a fifth later time, the display 104d presents the plurality of application icons, the first icon 160, and the second icon 162, with the second icon 162 being presented in a position adjacent to the position occupied by the first icon 160. While in the illustration of FIG. 3, the second icon 162 is presented to the immediate right of the first icon 160, in other presentation scenarios the second icon 162 may be presented in a different position adjacent to the first icon 160, for example above the first icon 160, below the first icon 160, or to the left of the first icon 160. At a sixth later time, the display 104e presents the plurality of application icons, the first icon 160, and the third icon 164 in the position previously occupied by the second icon 162. At a seventh later time, the display 104a is presented. It is noted that an advantage of the icon rotation scenario depicted in FIG. 3 is that the user may be less likely to be confused when looking for the first icon 160. A disadvantage of the icon rotation scenario depicted in FIG. 3 is that the presentation of the second icon 162 in display 104d and the presentation of the third icon 164 in display 104e consume more area of the display 104 than the icon rotation scenario depicted in FIG. 2. The rotation among the displays 104a, 104d, and 104e may be managed by the rotating icon SDK 124 using the same interactions with the OS and application launcher 120 and with the same timing intervals as described above with reference to FIG. 2.

With reference again to FIG. 1, when the application launcher 120 receives a user input for the first icon 160, it launches the mobile application 122 and the primary action of the mobile application 122 executes. In an embodiment, the primary action of the mobile application 122 is provided by executing the logic 126. When the application launcher 120 receives a user input for the second icon 162 or for the third icon 164, it launches the mobile application 122 and the alternate action of the mobile application 122 executes. In an embodiment, the alternate action of the mobile application 122 is provided by executing the logic 128 of the rotating icon SDK 124 and accessing a deep link 132 associated with the icon 162, 164. The deep link 132 may comprises a link or address of the associated mobile application stored in the data store 142 or mobile application store 140. When the rotating icon SDK 124 executes the deep link 132, it may communicate via the cellular transceiver 110 to the cell site 112 to the network 114 and to the mobile application store 140 and/or data store 142 to retrieve information about the mobile application and/or to download and install the mobile application on the mobile communication device 102. The deep link 132, alternately, may comprise a link to content at a content server or a web server. When the rotating icon SDK 124 executes the deep link 132, it may launch a browser to fetch and present content from a content server or may launch a player application to fetch and stream content such as a musical track or a video from a web server.

The communication system 100 may further comprise a content management server 150 that executes a content management application 152. The content management server 150 may be implemented as a computer system. Computer systems are described further hereinafter. The content management application 152 supports updating the icons 130 and the deep links 132 associated with the updated icons in the rotating icon SDK 124. The rotating icon SDK 124 may reach out to the content management application 152 to obtain new icons 130 and associated deep links 132. The content management application 152 may push new icons 130 and associated deep links 132 to the rotating icon SDK 124. The content management application 152 may select or curate icons and associated deep links for the mobile communication device 102 based on demographics of a user of the mobile communication device 102 and/or based on analysis of behavior of the user of the mobile communication device 102, for example by analyzing patterns of downloading and installing mobile applications, analyzing music streaming preferences, or analyzing video streaming preferences.

The content management application 152 may curate icons and associated deep links for the mobile communication device 102 based on matching the icons and associated deep links to the same category of mobile application as a category of the installed mobile application 122 or to the same category of content. The content management application 152 may curate icons and associated deep links for the mobile communication device 102 base on matching icons and associated deep links to a category of mobile application that is complimentary to the category of the installed mobile application 122. Gaming mobile applications may belong to a gaming category of mobile applications. A book review mobile application may belong to a reading category of mobile applications. A restaurant review mobile application may belong to a night-life category of mobile applications. A hotel reservation mobile application may belong to a category of mobile applications that is complementary to a travel category of mobile applications.

In an embodiment, the deep links involve a two-step navigation process. In an embodiment, when the rotating icon SDK 124 follows a deep link associated with the mobile application 122, a two-step process of navigation is performed. First, the rotating icon SDK 124 reaches out to the content management server 150 and/or the content management application 152 via the network 114 to look-up a uniform resource identifier (URI) or a uniform resource locator (URL) associated with the displayed icon 130. Second, the rotating icon SDK 124 uses the URI/URL obtained in the first step to reach out to the mobile application store 140 to obtain further information about the mobile application associated with the displayed icon by the content management server/content management application 152 and possibly to download and install the mobile application. This two-step navigation process promotes ease of changing the specific mobile application associated to the displayed icon. The content management application 152 may change the associations of rotating icons to mobile applications for different mobile communication devices 102 independently (e.g., the content management application 152 may associate a rotational icon presented on a display of a first mobile communication device to a first mobile application and associate the same rotational icon presented on a display of a second mobile communication device to a different second mobile application). The content management application 152 may change the associations so as to refresh alternative mobile applications available to a user, because the mobile application previously associated to the icon has been installed, or for another reason. In an embodiment, the functionality described above as being performed by the content management server 150 and/or the content management application 152 may be provided by the mobile application store 140.

While FIG. 1 shows details of a single mobile application 122, it is understood that a plurality of mobile applications 122 may be installed on the mobile communication device 102, where each separate mobile application 122 has its own logic 126 and its own instance of rotating icon SDK 124. Different rotating icon SDKs 124 in different mobile applications 122 installed in the mobile communication device 102 may have different icons 130 and different associated deep links 132 stored in the rotating icon SDKs 124.

Figure 4:
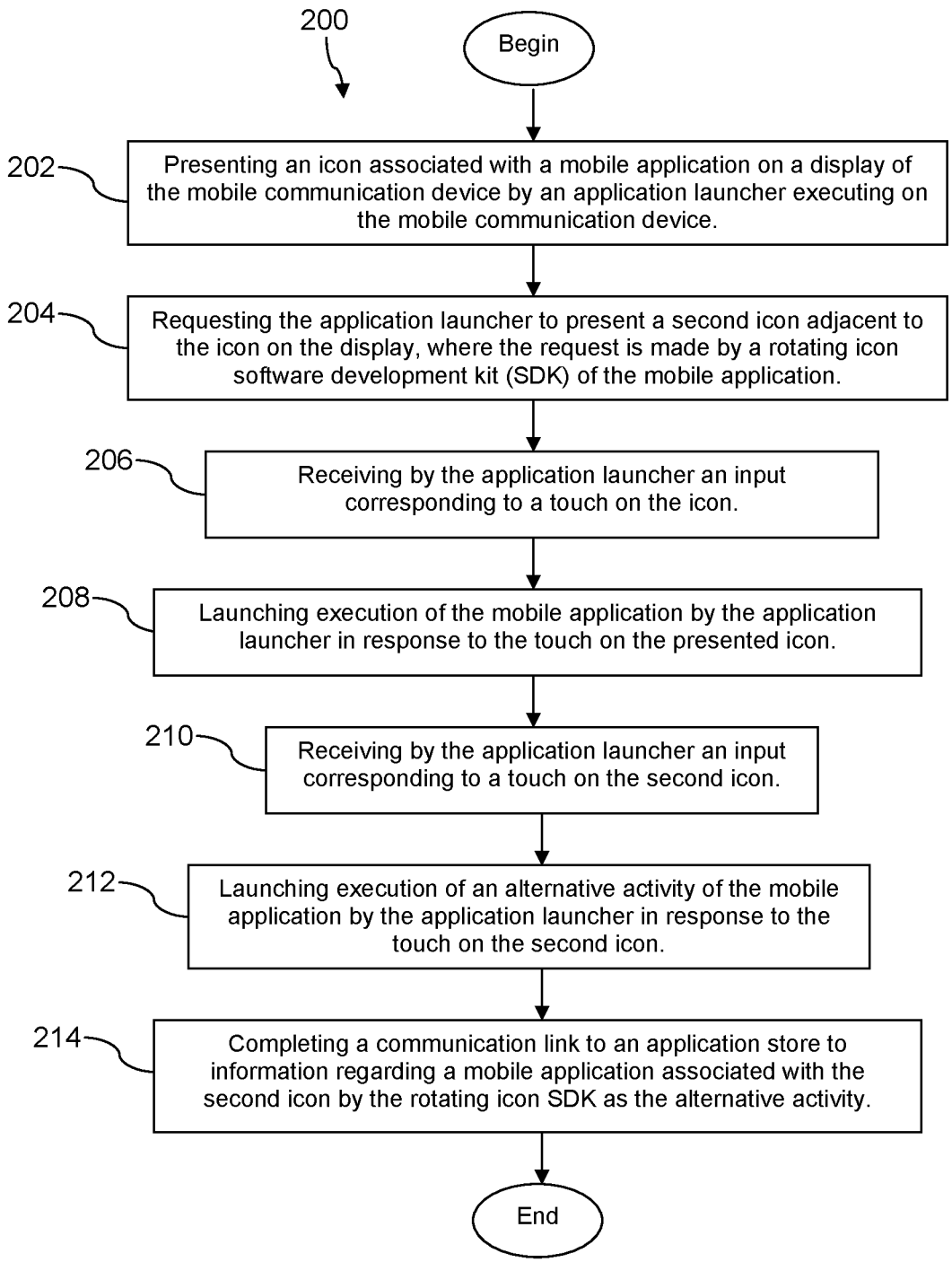
FIG. 4 is a flow chart of a method according to an embodiment of the disclosure.

Turning now to FIG. 4, a flow chart 200 is described. At block 202, method 200 includes presenting an icon associated with a mobile application on a display of the mobile communication device by an application launcher executing on the mobile communication device. The mobile application is installed on the mobile communication device. At block 204, method 200 includes requesting the application launcher to present a second icon adjacent to the icon on the display, where the request is made by a rotating icon software development kit (SDK) of the mobile application. The processing of block 204 may be performed after the mobile application is launched in response to the rotating icon SDK previously requesting an operating system scheduled invocation. After the processing of block 204, the mobile application may go to sleep (e.g., terminate execution).

At block 206, method 200 includes receiving by the application launcher an input corresponding to a touch on the icon. At block 208, method 200 includes launching execution of the mobile application by the application launcher in response to the touch on the presented icon. At block 210, method 200 includes receiving by the application launcher an input corresponding to a touch on the second icon.

At block 212, method 200 includes launching execution of an alternative activity of the mobile application by the application launcher in response to the touch on the second icon. At block 214, method 200 includes completing a communication link to an application store to information regarding an application associated with the second icon by the rotating icon SDK as the alternative activity. The processing of block 214 may further comprise downloading and installing the application associated with the second icon on the mobile communication device. In another case, the processing of block 214 may comprise launching a browser on the mobile communication device, completing a communication link to a content server, requesting content by the browser, and presenting the requested content on the display of the mobile communication device by the browser. In another case, the processing of block 214 may comprise launching a player application on the mobile communication device, completing a communication link to a web server, requesting content by the player application, and playing the requested content by the player application, for example playing a musical track or playing a video.

Figure 5:
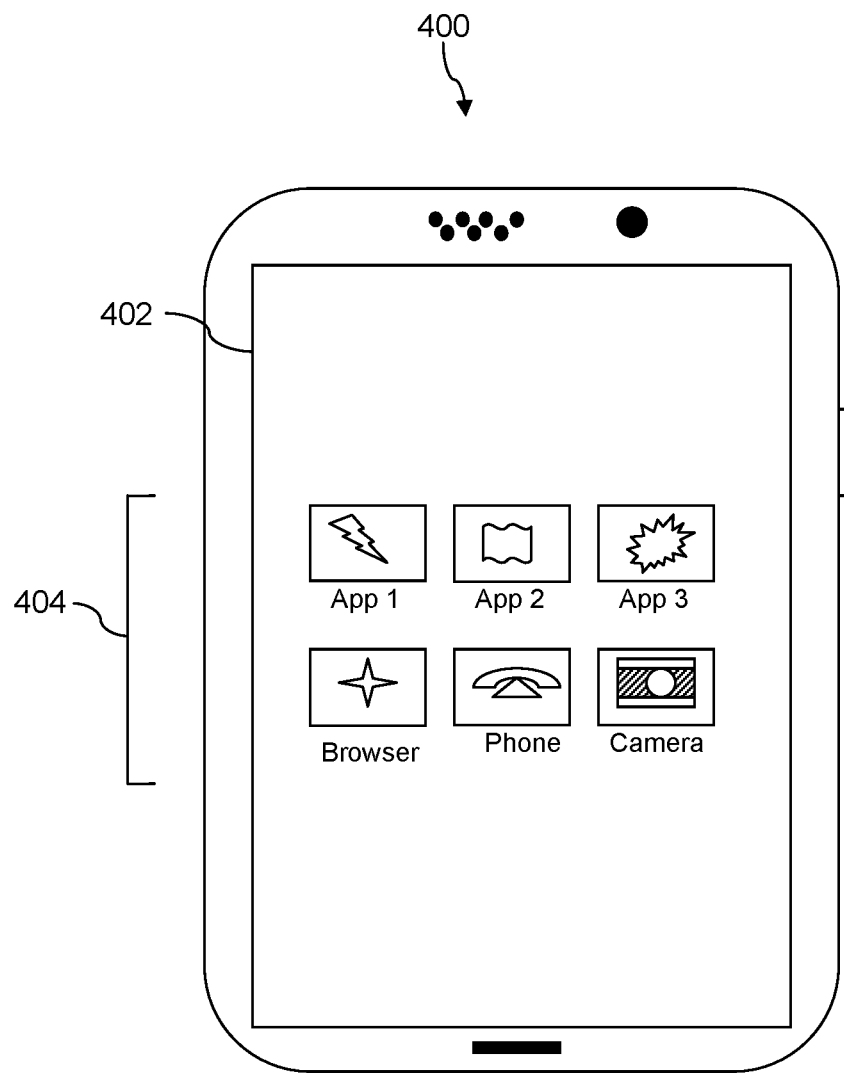
FIG. 5 is an illustration of mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
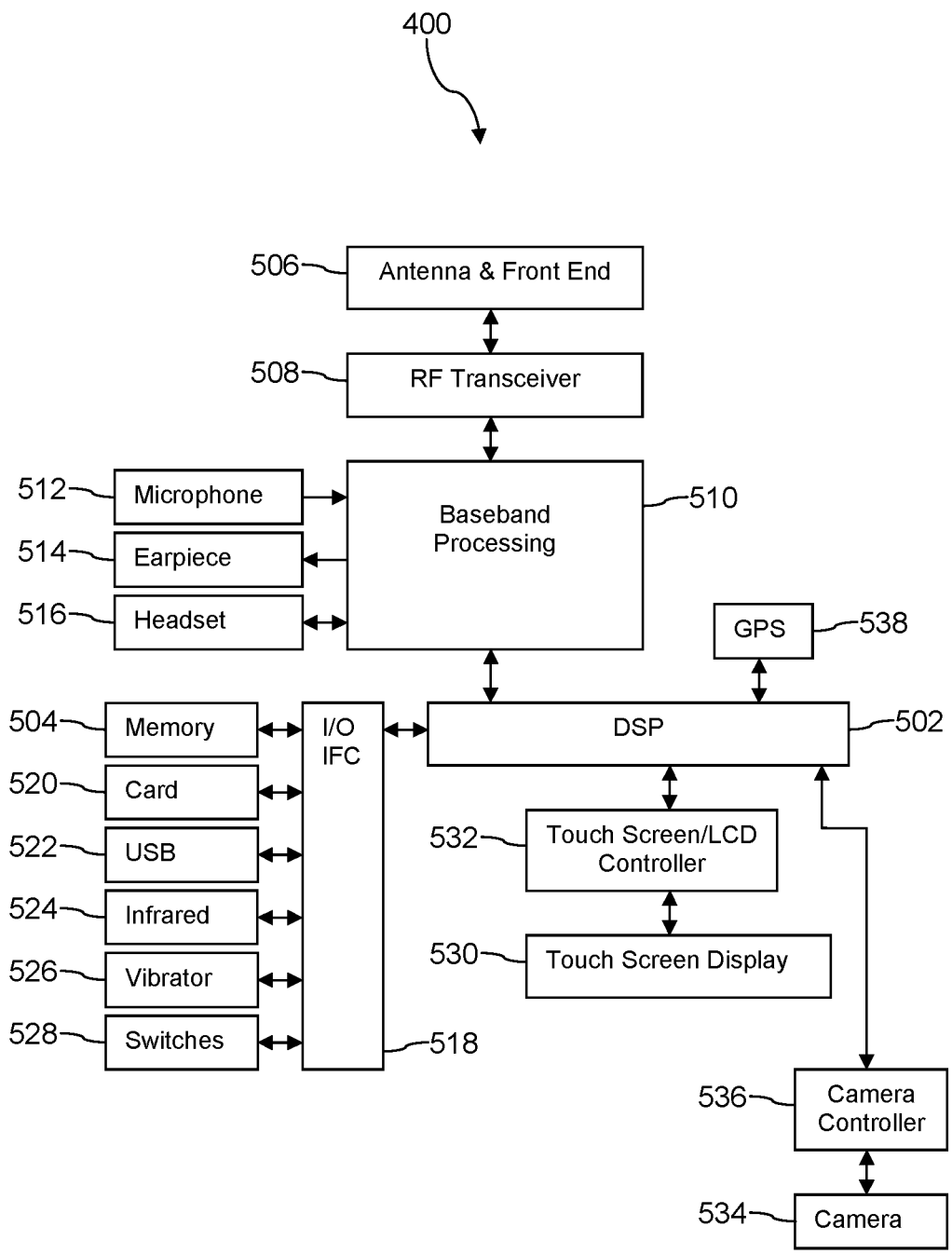
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
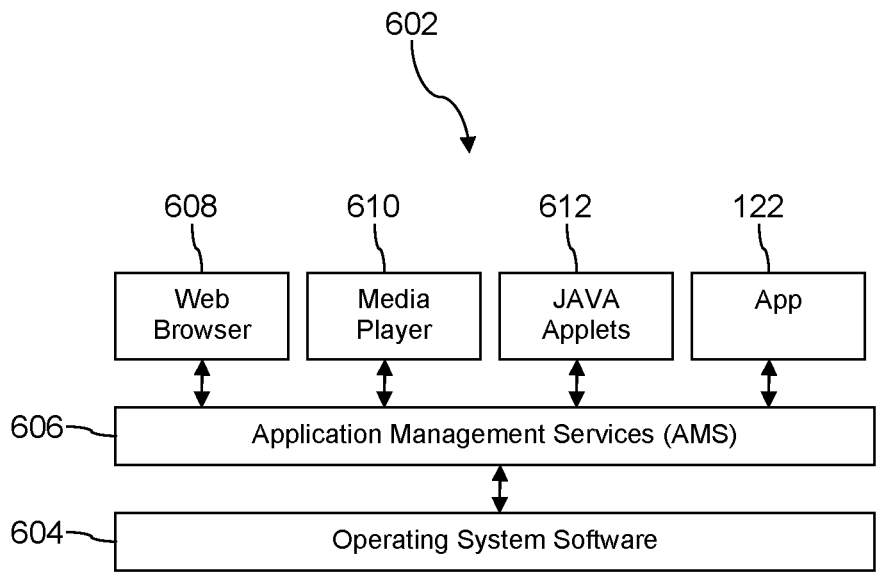
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, JAVA applets 612, and the mobile application 122. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
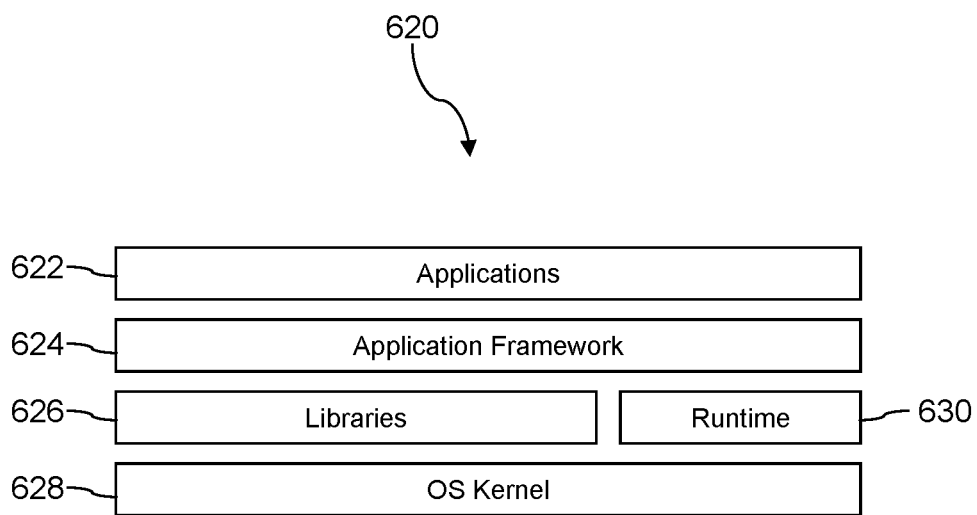
FIG. 7B is a block diagram of another software architecture according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
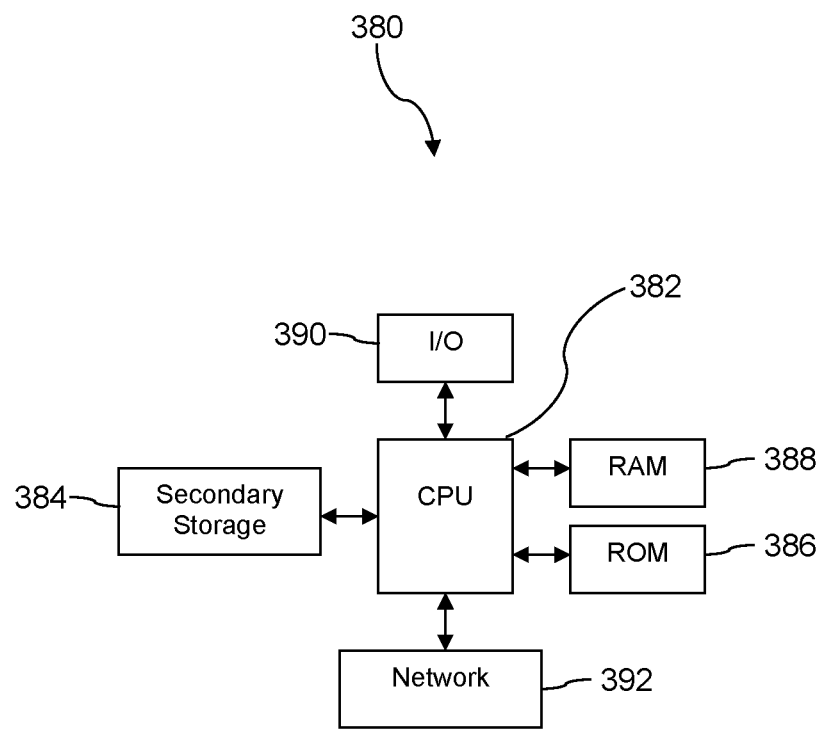
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, an analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
a display;
a processor;
a non-transitory memory;
an application launcher stored in the non-transitory memory that, when executed by the processor, presents a plurality of icons defined by mobile applications and launches execution of a mobile application; and
a first mobile application stored in the non-transitory memory that, when executed by the processor, requests the application launcher to present a first icon associated with the first mobile application at a first time in a first location on a graphical user interface (GUI) displayed on the display, wherein the first icon launches the first mobile application,
requests the application launcher to present a second icon associated with a second mobile application available in an application data store at a second time in the first location on the GUI displayed on the display, where the second time is after the first time, wherein the second icon launches the first mobile application,
requests the application launcher to present a third icon associated with a third mobile application available in the application data store at a third time in the first location on the GUI displayed on the display, where the third time is after the second time, wherein the third icon launches the first mobile application, and
requests the application launcher to present the first icon at a fourth time in the first location on the GUI displayed on the display, where the fourth time is after the third time,
whereby a rotating icon interface that utilizes the first location on the GUI displayed on the display as a same location for displaying mobile application icons is provided by the first mobile application to increase effective available display space of the display, and where:
when the first icon is selected, the application launcher launches the first mobile application and a primary activity of the first mobile application is performed,
when the second icon is selected, the application launcher launches the first mobile application, an alternative activity of the first mobile application is performed, and the first mobile application accesses a link to the second mobile application that references the application data store, and
when the third icon is selected, the application launcher launches the first mobile application, the alternative activity of the first mobile application is performed, and the first mobile application accesses a link to the third mobile application that references the application data store.

2. The mobile communication device of claim 1, wherein the mobile communication device is one of a mobile phone, a smart phone, a personal digital assistant (PDA), a wearable computer, a headset computer, a laptop computer, a tablet computer, or a notebook computer.

3. The mobile communication device of claim 1, wherein the first mobile application comprises a rotating icon software development kit (SDK) that requests the application launcher to present the first icon at the first time, the second icon at the second time, and the third icon at the third time.

4. The mobile communication device of claim 3, where the rotating icon SDK requests an operating system of the mobile communication device to execute the rotating icon SDK at the first time and goes to sleep after requesting the application launcher to present the first icon, requests the operating system of the mobile communication device to execute the rotating icon SDK at the second time and goes to sleep after requesting the application launcher to present the second icon, and requests the operating system of the mobile communication device to execute the rotating icon SDK at the third time and goes to sleep after requesting the application launcher to present the third icon.

5. The mobile communication device of claim 1, where when the second icon is selected with a long press, the application launcher launches the first mobile application and presents a user interface screen that includes a menu of selection options comprising a execute the first mobile application selection option and an uninstall the first mobile application selection option.

6. The mobile communication device of claim 1, wherein the first mobile application further requests replacement icons and links to the application data store associated with the replacement icons from a rotating icon application that executes on a server and replaces the second icon and the third icon with replacement icons.

7. The mobile communication device of claim 1, wherein the first mobile application further receives replacement icons and links to the application data store associated with the replacement icons pushed to it from a rotating icon application that executes on a server and replaces the second icon and the third icon with replacement icons.

8. A method of providing a rotating icon interface on a mobile communication device, comprising:
   requesting, by a rotating icon software development kit (SDK) of the first mobile application, an application launcher executing on the mobile communication device to present a first icon associated with a first mobile application at a first time in a first location on a display of the mobile communication device, wherein the first icon launches the first mobile application;
   requesting, by the rotating icon SDK, the application launcher to present a second icon associated with a second mobile application available in an application data store at a second time in the first location on the display, where the second time is after the first time, wherein the second icon launches the first mobile application;
   requesting, by the rotating icon SDK, the application launcher to present a third icon associated with a third mobile application available in the application data store at a third time in the first location on the display, where the third time is after the second time, wherein the third icon launches the first mobile application;
   requesting, by the rotating icon SDK, the application launcher to present the first icon at a fourth time in the first location on the display, where the fourth time is after the third time, whereby a rotating icon interface that utilizes the first location on the display as a same location for displaying mobile application icons is provided by the first mobile application to increase effective available display space of the display;
   in response to receiving by the application launcher an input corresponding to a touch on the first icon, launching execution of the first mobile application by the application launcher and performing a primary activity of the first mobile application;
   in response to receiving by the application launcher an input corresponding to a touch on the second icon, launching execution of the first mobile application by the application launcher, performing an alternative activity of the first mobile application, and accessing, by the first mobile application, a link to the second mobile application that references the application data store; and
   in response to receiving by the application launcher an input corresponding to a touch on the third icon, launching execution of the first mobile application by the application launcher, performing the alternative activity of the first mobile application, and accessing, by the first mobile application, a link to the third mobile application that references the application data store.

9. The method of claim 8, further comprising:
   receiving by the application launcher an input corresponding to a long touch on the second icon; and
   in response to receiving the input corresponding to the long touch on the second icon, presenting a user interface screen on the mobile communication device that includes a menu of selection options comprising an execute the first mobile application selection option and an uninstall the first mobile application selection option.

10. The method of claim 9, wherein the rotating icon SDK presents the user interface screen on the mobile communication device that includes the menu of selection options.

11. The method of claim 8, further comprising:
   receiving by the rotating icon SDK a replacement icon and a link to the application data store to information regarding a replacement mobile application associated with the replacement icon;
   requesting the application launcher to present the replacement icon adjacent to the first icon on the display;
   receiving by the application launcher an input corresponding to a touch on the replacement icon;
   launching execution of the alternative activity of the first mobile application by the application launcher in response to the touch on the replacement icon; and
   completing a communication link to the application data store to information regarding the replacement mobile application associated with the replacement icon by the rotating icon SDK as the alternative activity.

12. The method of claim 8, further comprising downloading and installing the second mobile application associated with the second icon by the rotating icon SDK.

13. The method of claim 12, wherein the second mobile application is distributed by the same mobile application distributor that distributes the first mobile application.

14. The method of claim 12, wherein the second mobile application belongs to a category of mobile applications that is the same as the category of mobile applications that the first mobile application belongs to.

15. The method of claim 12, wherein the second mobile application belongs to a category of mobile applications that is complimentary to the category of mobile applications that the first mobile application belongs to.

16. A mobile communication device, comprising:
   a display;
   a processor;
   a non-transitory memory;
   an application launcher stored in the non-transitory memory that, when executed by the processor, presents a plurality of icons defined by mobile applications and launches execution of a selected mobile application; and
   a first mobile application comprising a rotating icon software development kit (SDK) stored in the non-transitory memory wherein, when the first mobile application is executed by the processor,
      the SDK requests the application launcher to present a plurality of application icons in a rotation sequence in a same position on the display to increase effective available display space of the display, where the plurality of application icons comprises a first icon associated with the first mobile application, a second icon associated with a second mobile application, and a third icon associated with a third mobile application, wherein the first icon, the second icon, and the third icon launch the first mobile application, wherein when the first icon is selected, the application launcher launches the first mobile application and a primary activity of the first mobile application is performed, wherein when the second icon is selected, the application launcher launches the first mobile application, and a first alternative activity of the first mobile application is performed, wherein the first alternative activity comprises sending a first message comprising an identity of the second icon and requesting a uniform resource identifier (URI) or a uniform resource locator (URL) to a server computer, receiving a response message from the server computer comprising a link to an application store, downloading the second mobile application from the application store based on the link, and installing the second mobile application on the mobile communication device; and wherein when the third icon is selected, the application launcher launches the first mobile application, and a second alternative activity of the first mobile application is performed, wherein the second alternative activity comprises accessing a link to the third mobile application that references the application store.

17. The mobile communication device of claim 16, wherein the mobile communication device is one of a mobile phone, a smart phone, a personal digital assistant (PDA), a wearable computer, a headset computer, a laptop computer, a tablet computer, or a notebook computer.

18. The mobile communication device of claim 16, wherein the second mobile application is distributed by the same mobile application distributor that distributes the first mobile application.

19. The mobile communication device of claim 16, wherein the second mobile application belongs to a category of mobile applications that is the same as the category of mobile applications that the first mobile application belongs to.

20. The mobile communication device of claim 16, wherein the second mobile application belongs to a category of mobile applications that is complimentary to the category of mobile applications that the first mobile application belongs to.

\* \* \* \* \*